United States Patent
Tham et al.

(10) Patent No.: US 8,820,091 B2
(45) Date of Patent: Sep. 2, 2014

(54) EXTERNAL COOLING FLUID INJECTION SYSTEM IN A GAS TURBINE ENGINE

(71) Applicants: Kok-Mun Tham, Oviedo, FL (US); Ching-Pang Lee, Cincinnati, OH (US); Vincent P. Laurello, Hobe Sound, FL (US); Abdullatif M. Chehab, Chuluota, FL (US); David A. Kemp, Cincinnati, OH (US); John A. Fussner, Loveland, OH (US); Yan Yin, Oviedo, FL (US); Bijay K. Sultanian, Oviedo, FL (US); Weidong Cai, Oviedo, FL (US)

(72) Inventors: Kok-Mun Tham, Oviedo, FL (US); Ching-Pang Lee, Cincinnati, OH (US); Vincent P. Laurello, Hobe Sound, FL (US); Abdullatif M. Chehab, Chuluota, FL (US); David A. Kemp, Cincinnati, OH (US); John A. Fussner, Loveland, OH (US); Yan Yin, Oviedo, FL (US); Bijay K. Sultanian, Oviedo, FL (US); Weidong Cai, Oviedo, FL (US)

(73) Assignee: Siemens Aktiengesellschaft, München (DE)

( * ) Notice: Subject to any disclaimer, the term of this patent is extended or adjusted under 35 U.S.C. 154(b) by 31 days.

(21) Appl. No.: 13/670,788

(22) Filed: Nov. 7, 2012

(65) Prior Publication Data

US 2014/0123657 A1    May 8, 2014

(51) Int. Cl.
*F02C 6/04* (2006.01)
*F02C 7/12* (2006.01)

(52) U.S. Cl.
CPC ....................... *F02C 7/12* (2013.01)
USPC ........... 60/785; 60/782; 60/795; 60/806

(58) Field of Classification Search
CPC ....................................... F02C 7/12
USPC ................... 60/782, 785, 795, 806
See application file for complete search history.

(56) References Cited

U.S. PATENT DOCUMENTS

| | | | |
|---|---|---|---|
| 6,478,534 B2 | 11/2002 | Bangert et al. | |
| 6,487,863 B1 * | 12/2002 | Chen et al. ................ | 60/782 |
| 6,978,621 B2 * | 12/2005 | Bunker et al. ............. | 60/782 |
| 7,269,955 B2 * | 9/2007 | Albers et al. .............. | 60/782 |
| 7,329,084 B2 | 2/2008 | Dittmann et al. | |
| 7,682,130 B2 | 3/2010 | Jurjevic | |
| 7,766,610 B2 | 8/2010 | Busekros et al. | |
| 7,798,767 B2 | 9/2010 | Kondo et al. | |
| 7,987,660 B2 | 8/2011 | Iwasaki et al. | |
| 8,087,251 B2 | 1/2012 | Iwasaki et al. | |
| 8,152,446 B2 * | 4/2012 | Zhang et al. .............. | 415/108 |
| 2009/0051167 A1 * | 2/2009 | Dinu ....................... | 290/52 |
| 2009/0056342 A1 | 3/2009 | Kirzhner | |
| 2010/0068035 A1 | 3/2010 | Roush et al. | |
| 2010/0189551 A1 | 7/2010 | Ballard, Jr. et al. | |

* cited by examiner

*Primary Examiner* — William H Rodriguez

(57) ABSTRACT

A cooling fluid air injection system for use in a gas turbine engine includes at an external cooling fluid source, at least one rotor cooling pipe, which is used to inject cooling fluid from the source into a rotor chamber, a piping system that provides fluid communication between the source and the rotor cooling pipe(s), a blower system for conveying the cooling fluid through the piping system and the rotor cooling pipe(s) into the rotor chamber, and a valve system. The valve system is closed during full load engine operation to prevent cooling fluid from the source from passing through the piping system, and open during less than full load engine operation to allow cooling fluid from the source to pass through the piping system.

20 Claims, 3 Drawing Sheets

EXTERNAL COOLING FLUID INJECTION SYSTEM IN A GAS TURBINE ENGINE

FIELD OF THE INVENTION

The present invention relates to an external cooling fluid injection system in a gas turbine engine, wherein the system is operable during less than full load operation to create a more uniform temperature distribution within select areas of the engine.

BACKGROUND OF THE INVENTION

During operation of a gas turbine engine, air is pressurized in a compressor section then mixed with fuel and burned in a combustion section to generate hot combustion gases. In a can annular gas turbine engine, the combustion section comprises an annular array of combustor apparatuses, sometimes referred to as "cans" or "combustors", which each supply hot combustion gases to a turbine section of the engine where the hot combustion gases are expanded to extract energy therefrom to provide output power, which is in turn used to produce electricity.

SUMMARY OF THE INVENTION

In accordance with the present invention, a gas turbine engine is provided comprising a compressor section where air pulled into the engine is compressed, a combustion section where fuel is mixed with at least a portion of the compressed air from the compressor section and burned to create hot combustion gases, and a turbine section where the hot combustion gases from the combustion section are expanded to extract energy therefrom, wherein at least a portion of the extracted energy is used to rotate a turbine rotor during a first mode of engine operation comprising full load operation. The engine further comprises a rotor chamber in communication with structure to be cooled within the turbine section, at least one rotor cooling pipe that injects cooling air extracted from the engine into the rotor chamber during the first mode of engine operation, and a cooling fluid injection system. The cooling fluid injection system comprises a source of external cooling fluid to be injected into the rotor chamber only during a second mode of engine operation comprising less than full load operation, the at least one rotor cooling pipe, which is used to inject cooling fluid from the external cooling fluid source into the rotor chamber during the second mode of engine operation, a piping system that provides fluid communication between the external cooling fluid source and the at least one rotor cooling pipe, a blower system for conveying cooling fluid from the external cooling fluid source through the piping system and the at least one rotor cooling pipe into the rotor chamber, and a valve system. The valve system is closed during the first mode of engine operation to prevent cooling fluid from the external cooling fluid source from being conveyed through the piping system by the blower system, and open during the second mode of engine operation to allow cooling fluid from the external cooling fluid source to be conveyed through the piping system by the blower system.

In accordance with a second aspect of the present invention, a method is provided for operating a gas turbine engine. Air is compressed in a compressor section of the engine. Fuel is mixed with at least a portion of the compressed air and the mixture is burned in a combustion section of the engine to create hot combustion gases. The hot combustion gases are expanded to extract energy therefrom in a turbine section of the engine, wherein at least a portion of the extracted energy is used to rotate a turbine rotor during a first mode of engine operation comprising full load operation. Air extracted from the engine is injected into a rotor chamber through at least one rotor cooling pipe during the first mode of engine operation. The injected air provides cooling to structure to be cooled within the turbine section. During a second mode of engine operation comprising less than full load operation, operation of a blower system is enabled to convey cooling fluid from an external cooling fluid source through a piping system to the at least one rotor cooling pipe, and to inject the cooling fluid from the external cooling fluid source into the rotor chamber through the at least one rotor cooling pipe.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
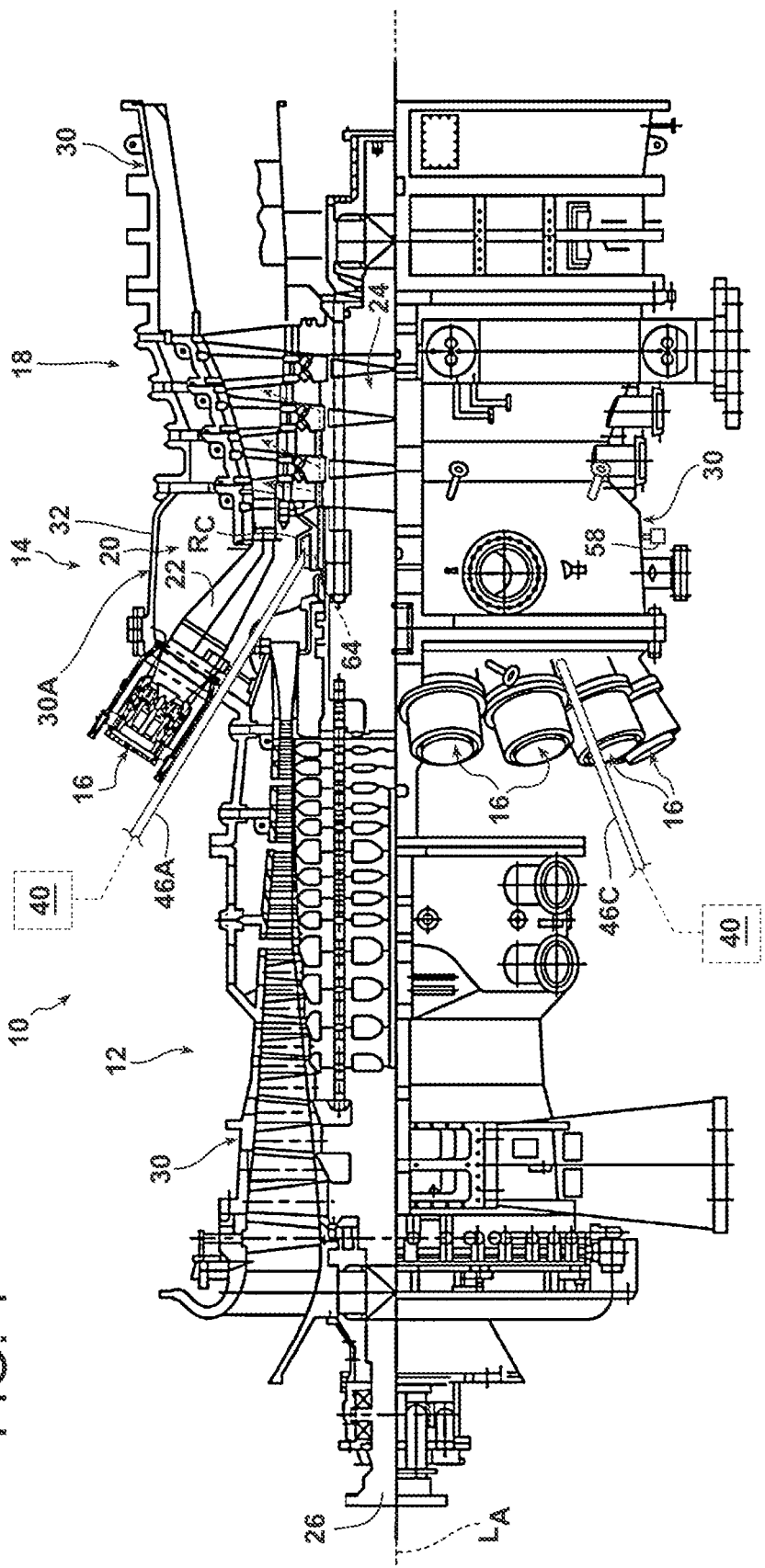
FIG. 1 is a side view, partially in section, of a gas turbine engine including a cooling fluid injection system according to an embodiment of the invention.

Referring to FIG. 1, a gas turbine engine 10 constructed in accordance with the present invention is shown. The engine 10 includes a compressor section 12, a combustion section 14 including a plurality of combustors 16, also referred to herein as "combustor apparatuses," and a turbine section 18. It is noted that the engine 10 according to the present invention preferably comprises an annular array of combustors 16 that are disposed about a longitudinal axis $L_A$ of the engine 10 that defines an axial direction within the engine 10. Such a configuration is typically referred to as a "canannular combustion system."

The compressor section 12 inducts and pressurizes inlet air, at least a portion of which is directed to a combustor shell 20 for delivery to the combustors 16. The air in the combustor shell 20 is hereinafter referred to as "shell air". Other portions of the pressurized air may be extracted from the compressor section 12 to cool various components within the engine 10, such as components in the turbine section 18.

Upon entering the combustors 16, the compressed air from the compressor section 12 is mixed with fuel and ignited to produce high temperature combustion gases flowing in a turbulent manner and at a high velocity within the respective combustor 16. The combustion gases in each combustor 16 then flow through a respective transition duct 22 (only one transition duct 22 is shown in FIG. 1) to the turbine section 18 where the combustion gases are expanded to extract energy therefrom. A portion of the energy extracted from the combustion gases is used to provide rotation of a turbine rotor 24, which extends parallel to a rotatable shaft 26 that extends axially through the engine 10 along the longitudinal axis $L_A$.

Figure 2:
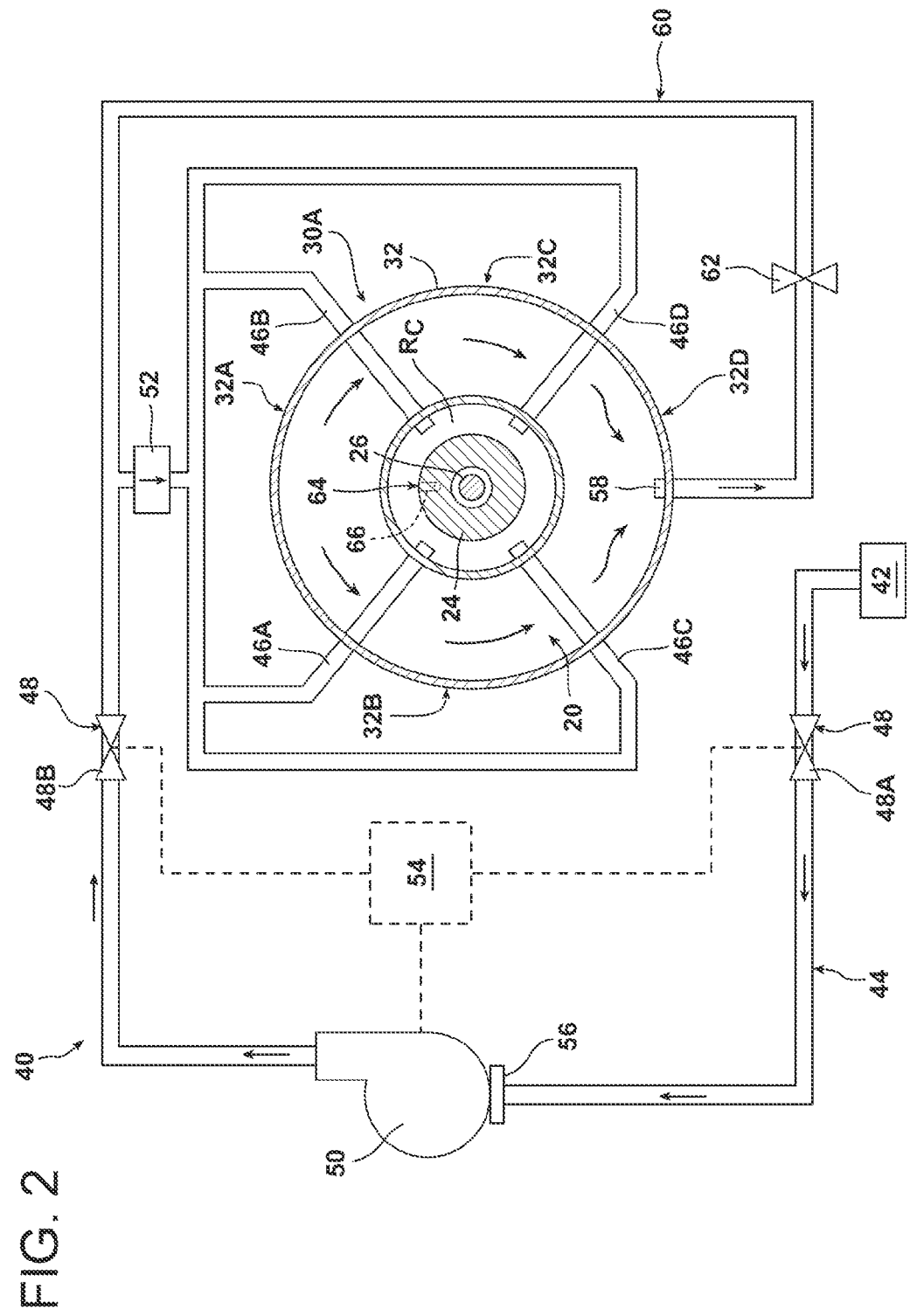
FIG. 2 is a schematic illustration of the cooling fluid injection system illustrated in FIG. 1.

As shown in FIG. 1, an engine casing 30 is provided to enclose the respective engine sections 12, 14, 18. A portion 30A of the casing 30 disposed about the combustion section 14 comprises a casing wall 32 that defines the combustor shell 20, i.e., the combustor shell 20 defines an interior volume within the casing portion 30A. As shown in FIG. 2, the casing wall 32 includes a top wall section 32A, left and right side wall sections 32B, 32C, and a bottom wall section 32D.

An external cooling fluid injection system 40 according to an aspect of the present invention will now be described. Referring to FIG. 2, the cooling fluid injection system 40 in the embodiment shown comprises a source of external cooling fluid 42, which, in the embodiment shown, comprises an ambient air inlet port. While the external cooling fluid source 42 according to this embodiment comprises a single ambient air inlet port, other sources of cooling fluid may be used in addition to or in lieu of ambient air, such as, for example, mist, steam, or water. Further, additional ambient air ports may be provided.

The cooling fluid injection system 40 further comprises a piping system 44 that is provided to convey cooling fluid from the external cooling fluid source 42 to a plurality of rotor cooling pipes 46A, 46B, 46C, 46D, which are generally evenly spaced apart about the circumference of the casing wall 32, as shown in FIG. 2. While the cooling fluid injection system 40 according to this embodiment comprises four rotor cooling pipes 46A-D, any suitable number of rotor cooling pipes could be provided. As will be discussed below, the rotor cooling pipes 46A-D inject cooling fluid from the external cooling fluid source 42 into a rotor chamber $R_C$, which is in communication with structure to be cooled within the turbine section 18, such as, for example, rows of rotatable turbine blades $T_B$, blade disc structures $B_{DS}$ that support the rows of turbine blades $T_B$ and which form part of the rotor 24, and/or turbine disc cavities $T_{DC}$ located between the blade disc structures $B_{DS}$ and adjacent rows of stationary turbine vanes $T_V$, see FIG. 1A. As shown most clearly in FIG. 1A, the rotor chamber $R_C$ is at least partially located in the combustion section 14 and is isolated from the combustor shell 20, i.e., the rotor chamber Rc has no direct exposure to the combustor shell 20.

As shown in FIG. 2, the cooling fluid injection system 40 still further comprises a valve system 48 comprising first and second valves 48A, 48B in the embodiment shown although additional or fewer valves may be used, a blower system 50 comprising a single blower in the embodiment shown although additional blowers or ejectors may be used, and, optionally, a cooler 52. The valve system 48 and the blower system 50 are controlled by a controller 54 to selectively allow or prevent cooling fluid from the external cooling fluid source 42 from passing through the piping system 44, as will be described in detail below. The blower system 50 is provided for extracting the cooling fluid from the external cooling fluid source 42 and for conveying the extracted cooling fluid through the piping system 44 to the rotor cooling pipes 46A-D and into the rotor chamber $R_C$ when the valve system 48 is open. The cooler 52 is provided for cooling the cooling fluid. As shown in FIG. 2, a filter 56 may be provided between the external cooling fluid source 42 and the rotor chamber $R_C$ for filtering particles from the cooling fluid. According to the embodiment illustrated in FIG. 2, the filter 56 is affixed to an upstream side of the blower of the blower system 50, although the filter 56 could be located elsewhere downstream from the external cooling fluid source 42.

A method for operating the engine 10 will now be described. During normal operation of the engine 10, also known as full load or base load operation and also referred to herein as a first mode of engine operation, a pressure differential between the combustor shell 20 and the rotor chamber $R_C$ causes some of the shell air to flow out of the combustor shell 20 through an outlet port 58 (see FIGS. 1 and 2) located at the bottom wall section 32D of the casing wall 32 toward the rotor chamber $R_C$, i.e., a pressure in the rotor chamber $R_C$ is lower than a pressure within the combustor shell 20 during normal operation of the engine 10. It is noted that the outlet port 58 could be located at other locations in the casing wall 32. This portion of air that flows out of the combustor shell 20 through the outlet port 58 toward the rotor chamber $R_C$ during the first mode of engine operation is referred to herein as "primary path air." As shown in FIG. 2, the primary path air flows along a primary circuit 60 through a primary valve 62, which is only open during the first mode of engine operation, and passes through the cooler 52 for delivery into the rotor chamber $R_C$ through the rotor cooling pipes 46A-D. It is noted that while the primary path air described herein comprises shell air from the combustor shell 20, the primary path air could comprise air from other portions of the engine 10. For example, the primary path air could be bled directly off from the compressor section 12.

Figure 1A:
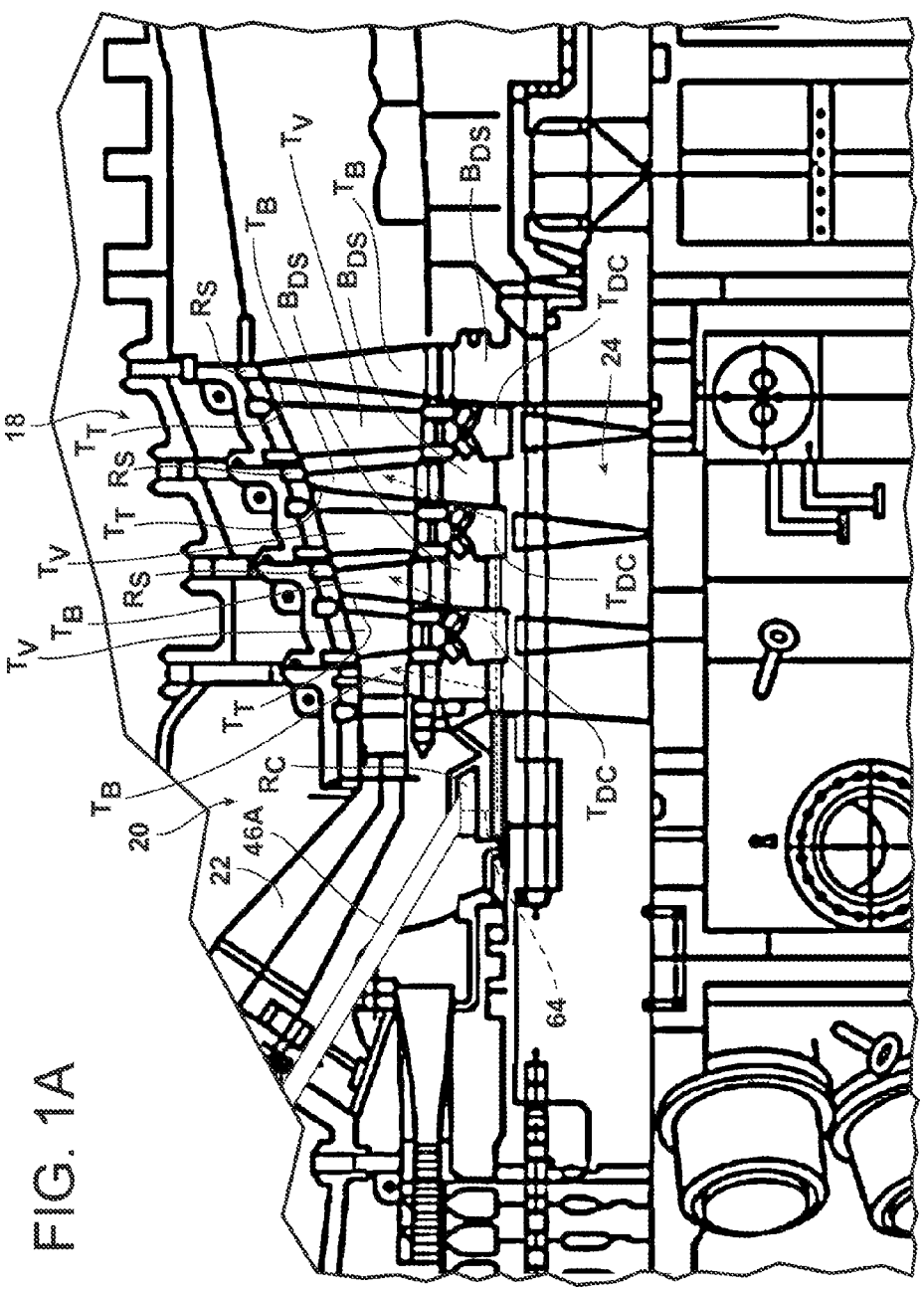
FIG. 1A is an enlarged portion of FIG. 1, illustrating a fluid circuit used to deliver cooling fluid to structure to be cooled within a turbine section of the engine.

Once in the rotor chamber $R_C$, the primary path air is delivered to the structure to be cooled in the turbine section 18 via a fluid circuit 64, see FIG. 1A. As will be apparent to those having ordinary skill in the art, the fluid circuit 64 may comprise, for example, a series of passages in the components between the rotor chamber $R_C$ and the structure to be cooled in the turbine section 18. For example, one or more passages 66 (see FIG. 2) may be formed through the rotor 24, which passages 66 may be in communication with passages (not shown) formed in the blade disc structures $B_{DS}$ in the turbine section 18. The passages in the blade disc structures $B_{DS}$ in turn may lead to the rows of turbine blades $T_B$ and/or the adjacent turbine disc cavities $T_{DC}$, as shown in FIG. 1A. It is noted that the cooling circuit 64 is schematically shown in FIG. 1A and could have any suitable configuration for delivering fluids to the structure to be cooled in the turbine section 18.

During the first mode of engine operation, the first and second valves 48A, 48B are closed and the blower system 50 is turned off or is otherwise not operational. Hence, the valve system 48 substantially prevents cooling fluid from the external cooling fluid source 42 from being conveyed by the blower system 50 through the piping system 44 and into the rotor chamber $R_C$, although it is noted that shell air passes into the rotor chamber $R_C$ through the primary circuit 60 during the first mode of engine operation as discussed above.

Upon initiation of a turn down operation, which is implemented to transition the engine 10 to a shut down state or a turning gear state, the supply of fuel to the combustors 16 is eventually ceased, such that the production of high temperature combustion gases in the combustors 16 is decreased to null. Once combustion gases are no longer produced in the combustors 16, rotation of the turbine rotor 24 is not able to be effected by combustion gases, and rotation of the turbine rotor 24 coasts down to a near stop. After coasting to a near stop, slow rotation of the turbine rotor 24 may be effected by an outside power supply (not shown), such as by a start-up motor, in an operating state referred to herein as a turning gear state. In a typical engine 10, such a turn down operation may take at least about 10-15 minutes to completely transition the engine 10 to a turning gear state, during which time combustion in the combustors 16 is eventually stopped. Alternatively, rotation of the turbine rotor 24 may be completely stopped in an operating state referred to herein as a shut down state. The second mode of engine operation, as used herein, is meant to encompass turn down operation, a turning gear state, or a shut down state of the engine 10, which are all engine operating states that are less than full load operation, i.e., the first mode of engine operation.

According to an aspect of the present invention, upon initiation of a turn down operation to transition the engine 10 to either a turning gear state or a shut down state, the controller 54 opens the first and second valves 48A, 48B and closes the primary valve 62 to prevent air from passing through the primary circuit 60. The blower system 50 is turned on or is otherwise enabled by the controller 54 during the second mode of engine operation to extract cooling fluid from the external cooling fluid source 42. The blower system 50 conveys, i.e., pumps, the cooling fluid through the piping system 44 and the rotor cooling pipes 46A-D and injects the cooling fluid into the rotor chamber $R_C$. Once in the rotor chamber $R_C$, the cooling fluid is delivered to cool the structure within the turbine section 18 via the fluid circuit 64, see FIG. 1A.

According to another aspect of the invention, the turning gear state may be run for a predetermined time or until one or more select engine components reaches a predefined temperature, at which point the engine 10 may be transitioned to a shut down state. Under this arrangement, during the turning gear state, the valves 48A, 48B are maintained in open positions and operation of the blower system 50 is continued to extract cooling fluid from the external cooling fluid source 42, to convey the extracted cooling fluid through the piping system 44 and the rotor cooling pipes 46A-D, and to inject the extracted cooling fluid into the rotor chamber $R_C$. However, upon the engine 10 entering the shut down state, i.e., after completion of the turning gear state, the blower system 50 may be turned off or otherwise disabled by the controller 54 to stop the pumping of cooling fluid. During the shut down state, the valves 48A, 48B may remain open or the controller 54 may close them, but they would be closed by the controller 54 and the primary valve 62 would be opened upon the initiation of an engine start up procedure to transition the engine 10 back to full load operation.

According to yet another aspect of the invention, during the second mode of engine operation the controller 54 may open/close the valve system 48 and enable/disable operation of the blower system 50 based on a temperature differential between the top wall section 32A of the engine casing portion 30A and the bottom wall section 32D of the engine casing portion 30A. For example, during the second mode of engine operation, if the temperature at the top wall section 32A is determined to be greater than the temperature at the bottom wall section 32D by more than a first predetermined amount, the valve system 48 may be opened and operation of the blower system 50 may be enabled until the temperature at the top wall section 32A is determined to be greater than the temperature at the bottom wall section 32D by less than a second predetermined amount. It is noted that temperature differentials at other locations within the engine 10 may also be used to activate the opening/closing of the valve system 48 and enabling/disabling operation of the blower system 50, such as, for example, temperature differentials between top and bottom sections of the portion of the casing 30 associated with the turbine section 18.

According to still yet another aspect of the invention, during the second mode of engine operation, operation of the blower system 50 may be alternated with a spin cooling operation. During an exemplary spin cooling operation, the blower system 50 may be turned off to stop the conveyance of cooling fluid from the external cooling fluid source 42 through the piping system 44 and into the rotor chamber $R_C$, and a rotational speed of the rotor 24 may be increased to a predetermined speed, such as, for example, about 850 RPM, without burning air and fuel in the combustion section 14, i.e., such that combustion gases are not produced in the combustors 16. The spin cooling operation may be performed for a predetermined period, such as, for example, a predetermined time period of, for example, about five minutes, until select engine components reach a desired temperature, until component temperature differentials reach a predetermined target, etc.

After performing a spin cooling operation, operation of the blower system 50 may once again be enabled to convey cooling fluid from the external cooling fluid source 42 through the piping system 44 and the rotor cooling pipes 46A-D into the rotor chamber $R_C$. As noted above, spin cooling operations may be alternated with operation of the blower system 50 during the second mode of engine operation to maximize cooling of the structure to be cooled in the turbine section 18, and, in particular, the turbine rotor 24, and also to promote more uniform cooling within the engine 10.

The cooling of the structure to be cooled within the turbine section 18, e.g., the rows of rotatable turbine blades $T_B$, the blade disc structures $B_{DS}$, the turbine disc cavities $T_{DC}$, etc., by the cooling fluid supplied to the rotor cavity $R_C$ by the cooling fluid injection system 40 reduces thermal expansion of the blade disc structure $B_{DS}$ and the turbine blades $T_B$. Further, the cooling of the structure to be cooled within the turbine section 18 by the cooling fluid creates a more uniform temperature distribution within the turbine section 18, as hotter air tends to migrate to the top of the casing 30 in the turbine section 18, thus resulting in hotter temperatures at the top of the casing 30 than at the bottom.

The reduction in thermal expansion of the blade disc structure $B_{DS}$ and the turbine blades $T_B$ and the more uniform temperature within the turbine section 18 effected by the cooling fluid injection system 40 are believed to reduce or prevent issues that might otherwise result from components within and around the turbine section 18 thermally growing at different rates, such as distortion of the engine casing 30 and/or rubbing of tips $T_T$ of the turbine blades $T_B$ (see FIG. 1A) in the turbine section 18 against ring segments $R_S$ (see FIG. 1A) located outwardly from the turbine blades $T_B$, thus lengthening a lifespan of these components and maintaining a tight blade tip $T_T$ clearance during full load operation for improved turbine efficiency. The reduction/prevention of rubbing of the turbine blade tips $T_T$ on the ring segments $R_S$ also reduces/prevents tip oxidation due to overheating, as rubbing of these components could otherwise block off cooling holes formed in the turbine blade tips $T_T$.

Moreover, actively cooling the structure to be cooled in the turbine section 18, and more specifically, the turbine rotor 24, effected by the cooling fluid injection system 40 during the second mode of engine operation is believed to provide a reduction in length of service outages of the engine 10. For example, the engine 10 may be able to be serviced sooner if the cooling fluid injection system 40 is used to cool the turbine rotor 24, as, without the cooling fluid injection system 40, the engine 10 may have to be in a turning gear state for at least about 14 hours or in a spin cooling operation for an extended period before it can be serviced, as the turbine rotor 24 would be too hot for servicing of the turbine section 18. It is believed that by using the cooling fluid injection system 40 to cool the turbine rotor 24, the engine 10 may be serviced sooner. Further, the cooling fluid injection system 40 provides a simultaneous, combined approach for cooling the turbine rotor 24 and reducing/preventing distortion of the engine casing 30 by creating a more uniform temperature distribution within the engine casing 30.

While particular embodiments of the present invention have been illustrated and described, it would be obvious to those skilled in the art that various other changes and modifications can be made without departing from the spirit and scope of the invention.

It is therefore intended to cover in the appended claims all such changes and modifications that are within the scope of this invention.

What is claimed is:

1. A gas turbine engine comprising:
    a compressor section where air pulled into the engine is compressed;
    a combustion section where fuel is mixed with at least a portion of the compressed air from the compressor section and burned to create hot combustion gases;
    a turbine section where the hot combustion gases from the combustion section are expanded to extract energy therefrom, wherein at least a portion of the extracted energy is used to rotate a turbine rotor during a first mode of engine operation comprising full load operation;
    a rotor chamber in communication with structure to be cooled within the turbine section;
    at least one rotor cooling pipe that injects cooling air extracted from the engine into the rotor chamber during the first mode of engine operation; and
    a cooling fluid injection system comprising:
        a source of external cooling fluid to be injected into the rotor chamber only during a second mode of engine operation comprising less than full load operation;
        the at least one rotor cooling pipe, which is used to inject cooling fluid from the external cooling fluid source into the rotor chamber during the second mode of engine operation;
        a piping system that provides fluid communication between the external cooling fluid source and the at least one rotor cooling pipe;
        a blower system for conveying cooling fluid from the external cooling fluid source through the piping system and the at least one rotor cooling pipe into the rotor chamber; and
        a valve system that is:
            closed during the first mode of engine operation to prevent cooling fluid from the external cooling fluid source from being conveyed through the piping system by the blower system; and
            open during the second mode of engine operation to allow cooling fluid from the external cooling fluid source to be conveyed through the piping system by the blower system.

2. The gas turbine engine of claim 1, wherein the external cooling fluid source comprises at least one ambient air inlet port.

3. The gas turbine engine of claim 1, further comprising a filter located between the external cooling fluid source and the rotor chamber for filtering particles from the cooling fluid injected into the rotor chamber during the second mode of engine operation.

4. The gas turbine engine of claim 3, wherein the filter located is affixed to the blower system.

5. The gas turbine engine of claim 1, further comprising a controller for opening and closing the valve system based on a temperature differential between a top wall section of an engine casing and a bottom wall section of the engine casing.

6. The gas turbine engine of claim 1, wherein the valve system is:
    opened by a controller upon initiation of a turn down operation to transition the engine to one of a shut down state and a turning gear state; and
    closed by the controller upon initiation of a start-up operation to transition the engine to the first mode of engine operation.

7. The gas turbine engine of claim 6, wherein the turbine rotor is not rotated by energy extracted from combustion gases during the shut down state or the turning gear state.

8. The gas turbine engine of claim 1, wherein the cooling air injected by the at least one rotor cooling pipe into the rotor chamber during the first mode of engine operation comprises shell air extracted from a combustor shell associated with the combustion section.

9. The gas turbine engine of claim 1, wherein the rotor chamber is at least partially located in the combustion section.

10. The gas turbine engine of claim 1, wherein, during the second mode of engine operation, operation of the blower system is alternated with a spin cooling operation wherein, during spin cooling operation:
    the blower system is turned off; and
    a rotational speed of the rotor is increased to a predetermined speed without burning air and fuel in the combustion section.

11. The gas turbine engine of claim 10, wherein, after performing a spin cooling operation, operation of the blower system is enabled to convey cooling fluid from the external cooling fluid source through the piping system and the at least one rotor cooling pipe into the rotor chamber.

12. The gas turbine engine of claim 11, wherein the spin cooling operation is performed for a predetermined amount of time.

13. The gas turbine engine of claim 1, further comprising a cooler for cooling the cooling fluid from the external cooling fluid source prior to it being injected into the rotor chamber through the at least one rotor cooling pipe.

14. A method for operating a gas turbine engine comprising:
    compressing air in a compressor section of the engine;
    mixing fuel and at least a portion of the compressed air and burning the mixture in a combustion section of the engine to create hot combustion gases;
    expanding the hot combustion gases to extract energy therefrom in a turbine section of the engine, wherein at least a portion of the extracted energy is used to rotate a turbine rotor during a first mode of engine operation comprising full load operation;
    injecting air extracted from the engine into a rotor chamber through at least one rotor cooling pipe during the first mode of engine operation, the injected air providing cooling to structure to be cooled within the turbine section;
    during a second mode of engine operation comprising less than full load operation:
        enabling operation of a blower system to:
            convey cooling fluid from an external cooling fluid source through a piping system to the at least one rotor cooling pipe; and
            inject the cooling fluid from the external cooling fluid source into the rotor chamber through the at least one rotor cooling pipe.

15. The method of claim 14, wherein cooling fluid from the external cooling fluid source is not injected into the rotor chamber during the first mode of engine operation and air from the engine is not injected into the rotor chamber through at least one rotor cooling pipe during the second mode of engine operation.

16. The method of claim 15, wherein a valve system is open during the second mode of engine operation to allow cooling fluid from the external cooling fluid source to be conveyed through the piping system by the blower system.

17. The method of claim 16, wherein the valve system is closed during the first mode of engine operation to prevent air from being conveyed through the piping system by the blower system.

18. The method of claim 17, wherein the valve system is opened and closed by a controller based on a temperature differential between a top wall section of an engine casing and a bottom wall section of the engine casing, the engine casing being disposed about the sections of the engine.

19. The gas turbine engine of claim 17, wherein the valve system is:

opened by a controller upon initiation of a turn down operation to transition the engine to one of a shut down state and a turning gear state; and closed by the controller upon initiation of a start-up operation to transition the engine to the first mode of engine operation.

20. The method of claim 14, further comprising:

after the blower system has been operational for a predetermined period, disabling operation of the blower system and performing a spin cooling operation by increasing a rotational speed of the rotor without burning air and fuel in the combustion section; and after the spin cooling operation is performed, enabling operation of the blower system to convey cooling fluid from the external cooling fluid source through the piping system and the at least one rotor cooling pipe into the rotor chamber.

\* \* \* \* \*